United States Patent Office 3,502,591
Patented Mar. 24, 1970

3,502,591
EUROPIUM ACTIVATED PHOSPHOR BASED ON YTTRIUM ORTHOVANADATE
Tsuyoshi Kano, Tokyo, Yoshiro Otomo, Mitaka-shi, and Masayuki Emoto, Kodaira-shi, Japan, assignors to Hitachi, Ltd., Tokyo, Japan, a corporation of Japan
Filed Apr. 17, 1967, Ser. No. 631,388
Claims priority, application Japan, Apr. 25, 1966, 41/25,881
Int. Cl. C09k 1/44
U.S. Cl. 252—301.4      3 Claims

ABSTRACT OF THE DISCLOSURE

A europium activated yttrium vanadate phosphor containing silicon which is useful as a red color-emitting phosphor for color televisions and as a phosphor for high-pressure mercury lamps and plant-nurturing phosphor lamps. To the precipitate from the combined mixture of the solution containing component raw materials or to the combined mixture of component compounds, silicon compounds such as water glass or $SiO_2$ are added before firing. The amount of silicon in the final phosphor is 0.05–0.5% by weight, preferably 0.17–0.39%.

BRIEF SUMMARY OF THE INVENTION

The present invention relates to an improved europium activated yttrium vanadate phosphor.

DETAILED DESCRIPTION

It has been known that europium activated yttrium vanadate phosphor comprising europium, yttrium and vanadium is excellent in brightness as well as in color tone as a red color-emitting phosphor used for color televisions and also is excellent as a phosphor used for high-pressure mercury lamps and plant-nurturing phosphor lamps.

The procedures of mixing the powders of the various component materials and firing the mixture; mixing the solutions containing the component materials for said phosphor instead of mixing said powders to produce a precipitate and firing said precipitate; and the like have been known as the methods for preparing said phosphor. Moreover, it has been known that when the component materials for said phosphor is fired, flux may be added.

Although said vanadate phosphor is superior in the color tone as a red emitting phosphor, it has a disadvantage that the luminescence brightness is insufficient.

It is an object of the present invention to provide an europium activated yttrium vanadate phosphor improved in luminescence brightness.

It is another object of the present invention to provide an europium activated yttrium vanadate phosphor improved in its powder characteristics to have better powder layers in its application.

As a result of the various experiments carried out on the vanadate phosphor for the purpose of improving the brightness, the inventors have found that if a suitable amount of silicon is present in said phosphor, it has a great effect in increasing the luminescence brightness and at the same time obtaining the fine well-shaped crystals of said phosphor, uniformizing the crystallites and decoloring the matrix.

A crucible made of alumina or quartz is generally used for firing phosphor. When the quartz crucible is used, a very small amount of silicon diffuses from the inner wall of the crucible and is present in the produced phosphor. Moreover, in many cases the component materials for the phosphor contains a very small amount of silicon as impurities and most of it is retained in the produced phosphor. But the amount of silicon introduced into the produced phosphor as impurities in this way is so small, i.e., only about 0.05% at most by weight, that its effects and advantages are negligible.

Figure 1:
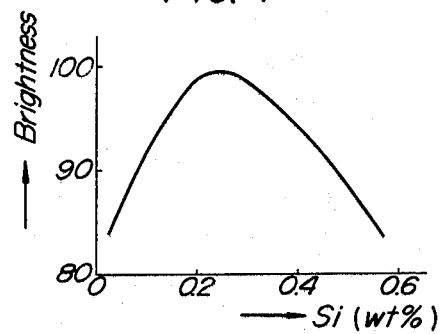
FIG. 1 shows a diagram representing the relationship between the amount of silicon (by weight percent) and the luminescence brightness.

The inventors investigated in detail about the influence of the amount of introduced silicon on the luminescence brightness and as a result, have obtained a characteristic curve as shown in FIG. 1, which represents the relationship between the amount of silicon (by weight percent) with respect to phosphor, present in the phosphor and the luminescence brightness (shown as the relative brightness). As is clear from the characteristic curve, the luminescence brightness depends strongly upon the amount of silicon and is remarkably improved with silicon content of 0.05–0.5% by weight with respect to the phosphor (the relative brightness≧87%). But the amount of silicon content is more preferably 0.08–0.47% by weight (the relative brightness≧90%) and particularly preferably 0.17–0.39% by weight (the relative brightness≧95%).

Figure 2A:
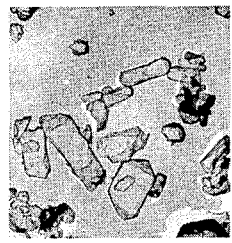
FIG. 2 is an electron microscopic photograph of phosphors (×2000);
(a): No silicon;
(b): Containing Si 0.28%

By observing the said silicon-containing phosphor crystals by an electron microscope in comparison with those of the phosphor, to which any silicon is not added, the results as shown in FIGS. 2(a) and (b) were obtained. (a) is the photograph of the phosphor to which no silicon is added and (b) is the one to which silicon is added (the silicon content is 0.28% by weight). The magnification of these photographs is 2000.

Figure 2B:

As is clearly seen from FIG. 2, the crystallites of the phosphor, to which no silicon is added, are somewhat elongated as shown in (a), while those of the silicon-containing phosphor are fine and less antisotropic in shape as shown in (b). Accordingly, if said silicon-containing phosphor is applied to Braun tubes, for example the brightness and the quality of the screen are remarkably improved, because said phosphor can be more favorably applied than ever. Moreover, said silicon-containing phosphor has a superiority in its resistance against deterioration, which generally occurs in its application to Braun tubes and the subsequent baking thereof.

In order to introduce silicon, such means as a procedure wherein a silicon compound is added to the phosphor materials before firing, a procedure wherein the phosphor materials are previously treated with a solution containing silicon and the like have been known. Either procedure is available for obtaining the improved Si-doped phosphor. As starting materials for introducing silicon, water glass, sodium silicate, lithium silicate, silicon oxide, metallic silicon, silicon oxide hydrate, or organo silicon compounds such as tetraethoxy-silane, which can be turned into silicon oxides or silicates on heating, may be used.

In short, in the present invention, it is important to control an amount of silicon in such a manner as an optimum amount of silicon is always contained in the phosphor by applying any one of the aforesaid various procedures for introducing silicon thereto. For that purpose, an amount of silicon contained in the raw materials as impurity and a very slight amount of silicon diffused out from the inside wall of a crucible, for example, in case a firing vessel made of quartz is employed, should be taken into account in advance.

The present invention will be explained further in detail with reference to the following examples.

Example 1

17.5 g. of yttrium oxide and 1.41 g. of europium oxide were dissolved in 55 cc. of concentrated nitric acid (the specific gravity is 1.38). On the other hand, 18.7 g. of ammonium metavanadate was dissolved by heating in a mixed solution of 50 cc. of 28% ammonia water and 720 cc. of water. These two sorts of solutions were mixed at 60° C. to produce a white precipitate. Said precipitate was washed with water and then dried. On the other hand, as a flux, 22.7 g. of vanadium pentoxide and 26.5 g. of sodium carbonate were dissolved by heating in water to produce 500 cc. of the solution, 1.5 cc. of which were added to 2.7 g. of said dried precipitate and mixed with 0.08 cc. of water glass containing 20% silicon oxide (the specific gravity is 1.23). After the precipitate obtained thereby was dried, it was fired in an alumina crucible at 1250° C. for 2 hours and then washed. The silicon content in the finally obtained phosphor was 0.28% by weight.

Example 2

Under the same conditions as described in Example 1, firing was carried out in a quartz boat instead of the alumina crucible. It was found that the optimum amount of the water glass to be added was 0.05 cc.

Example 3

Instead of the water glass used in Example 1, 3 mg. of fine powder of silicon oxide, which was prepared by heating a mixed solution consisting of 200 cc. of ethyl silicate and 100 cc. of ethyl alcohol at 70° C., adding 50 cc. of water to said mixed solution with stirring for 3 hours, were added to 2.7 g. of the dried precipitate described in Example 1. After that, according to the same procedure as described in Example 1, the phosphor containing silicon of 0.05% by weight was produced.

Example 4

16.3 g. of yttrium oxide and 1.32 g. of europium oxide were dissolved by heating in 56 cc. of concentrated nitric acid (the specific gravity is 1.38). On the other hand, 21.5 g. of ammonium metavanadate were dissolved at 70° C. in a mixed solution of 67 cc. of 28% ammonia water and 720 cc. of water. These two sorts of solutions were mixed with stirring for one hour to produce a precipitate. Said precipitate was washed with water and then dried. To 2.7 g. of the dried precipitate thus obtained, 0.12 g. of sodium carbonate and 0.03 cc. of water glass containing 20% silicon oxide (the specific gravity is 1.23) were added. After the product was fired in an alumina crucible for 2 hours, it was washed with water. The silicon content in the thus obtained phosphor was 0.1% by weight.

Example 5

Mixing 21.2 g. of yttrium oxide, 2.1 g. of europium oxide and 18.2 g. of vanadium pentoxide, the obtained mixture was fired for one hour. Then, to the fired product, 1% sodium pyrovanadate was added and moreover, 0.2 g. of silicon oxide prepared from ethyl silicate by hydrolysis were added. The obtained mixture was fired at 1250° C. and then washed with water. The silicon content in the produced phosphor was 0.2% by weight.

Example 6

51.4 g. of yttrium europium oxalate [$(Y_{0.95}, Eu_{0.05})_2(C_2O_4)_3, 3H_2O$] and 23.4 g. of ammonium metavanadate were fired at 800° C. for one hour under the oxygen atmosphere. After 2.1 g. of sodium carbonate, 1.8 g. of canadium pentoxide and 2.7 g. of the powder of silicon oxide were added to and mixed therewith, the mixture was fired at 1250° C. for 2 hours and then washed with water to remove the water-soluble component contained in the fired mixture therefrom. The silicon content in the produced phosphor was 0.5% by weight.

The above-mentioned examples are merely given as illustration of some procedures for controlling the amount of silicon content. In any case of these examples the amount of silicon added before firing, remains in the produced phosphor nearly quantitatively. This fact indicates that the silicon is introduced into the phosphor and acts effectively.

As mentioned above, some amount of silicon may be introduced from the raw materials and the crucible. But the amount of the silicon introduced thereby is very small. Although it depends upon firing time, firing temperature, the amount of the phosphor to be treated, the composition and the amount of flux to be used, it does not exceed 0.05% by weight if ordinary raw materials are used. For example, the amount of the silicon contained in the yttrium oxide (99.99%) produced by A Company is too small to be detected by spectroscopic analysis. The vanadium pentoxide produced by B Company contains 0.07% silicon. These materials were used and fired according to the procedure as described in Example 5 without adding any silicon. The thus obtained phosphor was found to contain silicon of only 0.03%, the effect of which was not so remarkable.

As methods for introducing silicon, besides the above-mentioned procedures, silicon may be added in the course of the process of refining raw materials. One of them will be described below.

Example 7

When ammonium vanadate was precipitated from sodium vanadate, water glass containing silicon of 1% by mole based on the weight of the dissolved vanadium was added thereto. The vanadium pentoxide obtained by firing the thus obtained ammonium vanadate was found to contain 0.3% silicon. With said pentoxide, phosphor was prepared according to the procedure as described in Example 5 without adding any silicon oxide. The silicon content in the obtained phosphor was 0.1% by weight.

As described above, the phosphor prepared in accordance with the present invention has outstanding advantages in the luminescence brightness and powder characteristics in comparison with the conventional phosphor and moreover can easily be put into practice operation. When it is applied to Braun tubes of color televisions, high-pressure mercury lamps, plant-nurturing phosphor lamps and the like, very significant effects and advantages are exhibited, whereby great industrial advantages can be obtained.

We claim:

1. A europium activated yttrium vanadate phosphor which contains 0.05–0.5% by weight of silicon with respect to the phosphor.

2. A europium activated yttrium vanadate phosphor according to claim 1, wherein the europium activated yttrium vanadate phosphor contains 0.08–0.47% by weight of silicon with respect to the phosphor.

3. A europium activated yttrium vanadate phosphor according to claim 1, wherein the europium activated yttrium vanadate phosphor is characterized by containing 0.17–0.39% by weight of silicon with respect to the phosphor.

References Cited

UNITED STATES PATENTS 3,368,980  2/1968  Avella et al. _____ 252—301.4

ROBERT D. EDMONDS, Primary Examiner